United States Patent [19]

Saito et al.

[11] 4,433,406
[45] Feb. 21, 1984

[54] ROTARY RECORDING MEDIUM CLAMPING MECHANISM

[75] Inventors: Takashi Saito, Ayase; Masafumi Mochizuki, Yamato; Norimasa Arai, Tokyo, all of Japan

[73] Assignee: Victor Company of Japan, Ltd., Yokohama, Japan

[21] Appl. No.: 296,496

[22] Filed: Aug. 26, 1981

[30] Foreign Application Priority Data

Aug. 26, 1980 [JP] Japan .................. 55-117335

[51] Int. Cl.³ ............................................ G11B 17/04
[52] U.S. Cl. .................................................. 369/77.2
[58] Field of Search ................. 369/77, 219, 243, 249, 369/262, 263, 270, 291, 292, 77.2

[56] References Cited

U.S. PATENT DOCUMENTS

| | | | |
|---|---|---|---|
| 4,098,511 | 7/1978 | Leedom | 369/77 |
| 4,129,866 | 11/1978 | Coleman | 369/77 |
| 4,239,108 | 12/1980 | Coleman et al. | 369/77 |

FOREIGN PATENT DOCUMENTS

52-71206 6/1977 Japan ............................ 369/77

*Primary Examiner*—Steven L. Stephan
*Attorney, Agent, or Firm*—Louis Bernat

[57] ABSTRACT

A rotary recording medium reproducing apparatus for reproduces a rotary recording medium accommodated within a case. The case comprises a jacket provided with a space for accommodating the rotary recording medium and an opening for allowing the rotary recording medium to go in and out of the jacket, and a lid member inserted through the opening of the jacket for closing the opening of the jacket. The rotary recording medium reproducing apparatus has a rotary recording medium clamping mechanism provided at an innermost part of the reproducing apparatus, for clamping an outer peripheral groove guard of the rotary recording medium when the case is inserted into the reproducing apparatus and then the jacket is pulled out from the reproducing apparatus. The rotary recording medium clamping mechanism comprises a rotatable lower clamp member, a mechanism for holding the lower clamp member to assume a substantially horizontal position upon clamping, an upper clamp member provided rotatable to oppose the lower clamp member and having projection projected downwards at a tip end thereof, and a mechanism for locking the upper clamp arm, after the outer peripheral groove guard of the rotary recording medium enters between the upper and lower clamp members, in a state where the projection faces the inner side of the outer peripheral groove guard.

7 Claims, 15 Drawing Figures

ROTARY RECORDING MEDIUM CLAMPING MECHANISM

BACKGROUND OF THE INVENTION

The present invention relates to rotary recording medium reproducing apparatuses capable of placing and leaving a rotary recording medium in a state possible for reproduction within the rotary recording medium reproducing apparatus when a jacket (disc case) having a lid for accommodating the rotary recording medium therein is inserted into and then pulled out from within the rotary recording medium reproducing apparatus, and also capable of incasing the rotary recording medium within the jacket so that the rotary recording medium can be obtained outside the rotary recording medium reproducing apparatus together with the jacket, when the empty jacket is inserted into and then pulled out from within the reproducing apparatus. The present invention further and especially relates to the above type of a rotary recording medium reproducing apparatus having a rotary recording medium clamping mechanism for clamping the rotary recording medium accommodated within the jacket when the disc case is inserted into and then pulled out from within the reproducing apparatus.

Conventionally, in an apparatus for reproducing a rotary recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus.

As a conventional apparatus of this type, a reproducing apparatus was proposed in a U.S. patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, a disc clamping mechanism for clamping the disc provided at an innermost part on the opposite side from the inserting opening with respect to the turntable, lowering and raising means for lowering the disc to a position where the disc is placed on the turntable from a clamping position where the disc is clamped by the clamping mechanism upon starting of the reproduction and raising the disc to the clamping position from the turntable upon finishing or discontinuing of the reproduction, a reproducing transducer for reproducing and disc placed on the turntable, and moving means for moving the reproducing transducer from a waiting position to a reproducing position with respect to the disc.

In the above previously proposed reproducing apparatus, the disc clamping mechanism comprises a lower clamp arm which comes to be held horizontally upon clamping the disc, an upper clamp arm disposed to face the lower clamp arm, and a spring member which is forcibly deformed resiliently when the disc case is inserted to the innermost position inside the reproducing apparatus, thereby imparting a clamping force to the upper clamp arm, and is adapted to sandwich an outer peripheral groove guard of the disc between the upper and lower clamp arms due to a spring force thereby clamping the disc. In this disc clamping mechanism, since the spring member should be forced to undergo resilient deformation in response to insertion of the disc case into the reproducing apparatus, the operation for inserting the disc case to the final position inside the reproducing apparatus accompanies not only deterioration of tactile feeling of operation but also requirements of a large operational force for inserting the disc case into the reproducing apparatus. In a case where a larger spring member is employed to increase the clamping force, stronger operational force is required by that much. This gives rise to problems such that the disc case insertion operation may cause the reproducing apparatus to be pushed backwards undesirably, and that by ceasing insertion operation upon felt heavy, the jacket is erroneously pulled out before the disc case reaches the final position, which results in that the disc is not clamped normally.

SUMMARY OF THE INVENTION

Accordingly, it is a general object of the present invention to provide a novel and useful rotary recording medium reproducing apparatus in which the above described problems have been solved.

Another and more specific object of the present invention is to provide a rotary recording medium reproducing apparatus provided with a rotary recording medium clamping mechanism in which an upper clamp arm is of a shape of having a projection projected downwards at a tip end thereof, and which is capable of clamping a rotary recording medium by locking the upper clamp arm, in response to insertion of the disc case into the reproducing apparatus, at its rotational position where the tip end projection comes to confront the inner side of the outer peripheral groove guard of the rotary recording medium. According to the apparatus of the present invention, a disc case insertion operation for loading the rotary recording medium within the reproducing apparatus can be performed smoothly with a small force, and further, the rotary recording medium can be clamped positively.

Other objects and further features of the present invention will be apparent from the following detailed description when read in conjunction with the accompanying drawings.

DETAILED DESCRIPTION

Figure 1:
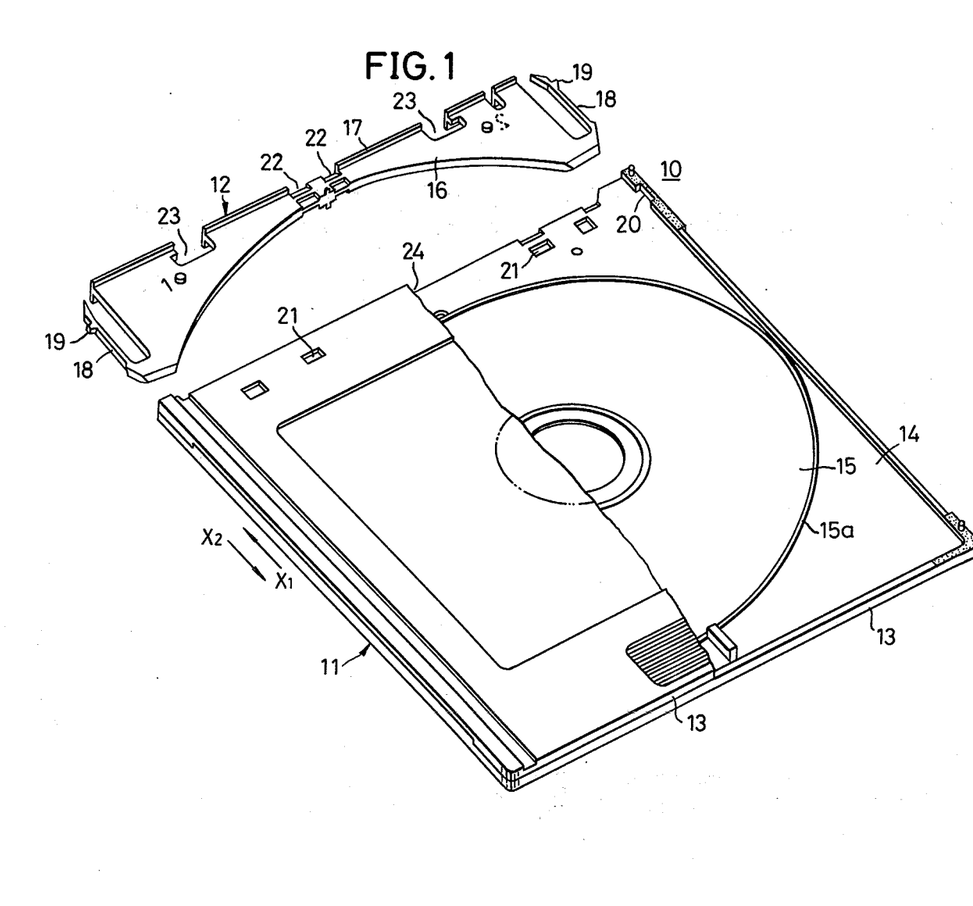
FIG. 1 is a perspective view showing an example of a disc case which operates together with a rotary recording medium reproducing apparatus according to the present invention, with a part cut away and disassembled.

In FIG. 1, a disc case 10 comprises a jacket 11 and a lid plate 12. The jacket 11 is assembled from a pair of jacket halves 13, and comprises a flat cavity or space 14 therein. This space 14 is open at an opening 24 at the front side of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
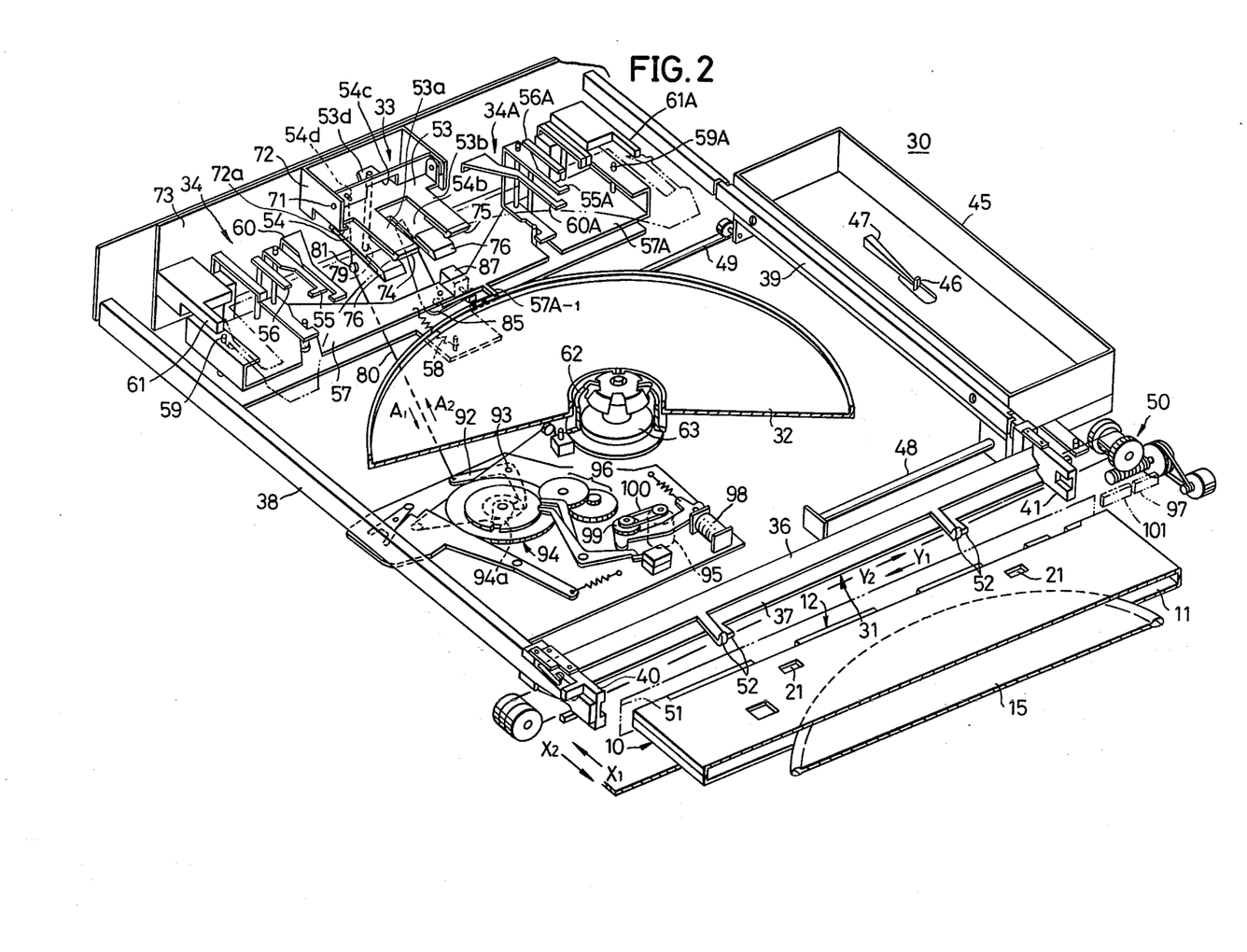
FIG. 2 is a perspective view showing the inner construction of a rotary recording medium reproducing apparatus according to the present invention, with a part cut away.

As shown in FIG. 2, a reproducing apparatus 30 substantially comprises a jacket opening enlarging mechanism 31, a turntable 32 for rotating the disc 15 positioned thereon, a disc clamping mechanism 33, for clamping the disc 15, which forms an essential part of the apparatus according to the present invention, a lid plate locking mechanisms 34 and 34A for locking the lid plate 12, and the like.

The jacket opening enlarging mechanism 31 consists of upper and lower beams 36 and 37 extending in directions of arrows Y1 and Y2, and sliders 40 and 41 which are respectively fixedly inserted into guide rails 38 and 39, to support both ends of the respective beams 36 and 37 and to move along the guide rails 38 and 39. The jacket opening enlarging mechanism 31 is guided by guide rails 38 and 39, and moves between the innermost part of the reproducing apparatus 30 and a disc case inserting opening 51 provided at the frame of the reproducing apparatus 30, in the direction of arrows X1 and X2.

A pickup carriage 45 is provided with a reproducing stylus 46 and a cantilever 47, and moves in the directions of the arrows Y1 and Y2 along a pair of guide rails 48 and 49.

Upon reproduction of the disc 15, the disc case 10 is inserted through the inserting opening 51 of the reproducing apparatus 30, by inserting the disc case 10 with the side of the lid plate 12 into the direction of the arrow X1.

When the disc case 10 is inserted into the reproducing appparatus 30 in the above described state, in the jacket opening enlarging mechanism 31 is pushed and moved in the direction of the arrow X1. When the enlarging mechanism 31 moves, the upper and lower beams 36 and 37 rotate, and the enlarging fingers 53 thus move upwards and downwards to mutually separate from each other. Accordingly, the tip ends of the enlarging fingers 52 engage with engaging windows 21 of the jacket 11, and enlarge the front part of the upper and lower jacket halves 13 upwards and downwards, to enlarge the opening 24.

When the disc case 10 is inserted into the innermost part of the reproducing apparatus 30 together with the enlarging mechanism 31 through the upper side of the turntable 32, upper and lower clamp arm members 53 and 54 of the disc clamping mechanism 33 clamps a groove guard 15a of the disc 15, as will be described hereinafter.

Accompanied by the insertion of the disc case 10, locking fingers 55 and 55A relatively enter inside L-shaped cutouts 23 of the lid plate 12, and the rim portion 17 accordingly pushes contact fingers 56 and 56A. When the contact fingers 56 and 56A are pushed by the lid plate 12, left and right main levers 57 and 57A respectively rotate in counterclockwise and clockwise directions about shafts 59 and 59A, against a force exerted by a spring 58, and then latched as will be described hereinafter. Due to the above rotations of the main levers 57 and 57A, the locking fingers 55 and 55A respectively rotate so as to separate from each other towards the left and right hand sides. Accordingly, the locking fingers 55 and 55A enter within the cutouts 23, to lock the lid plate 12. Therefore, the lid plate 12 is locked and held at the innermost part of the reproducing apparatus 30, in a state where the lid plate 12 is placed onto support fingers 60 and 60A.

Furthermore, engagement releasing members 61 and 61A enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

Figure 3:
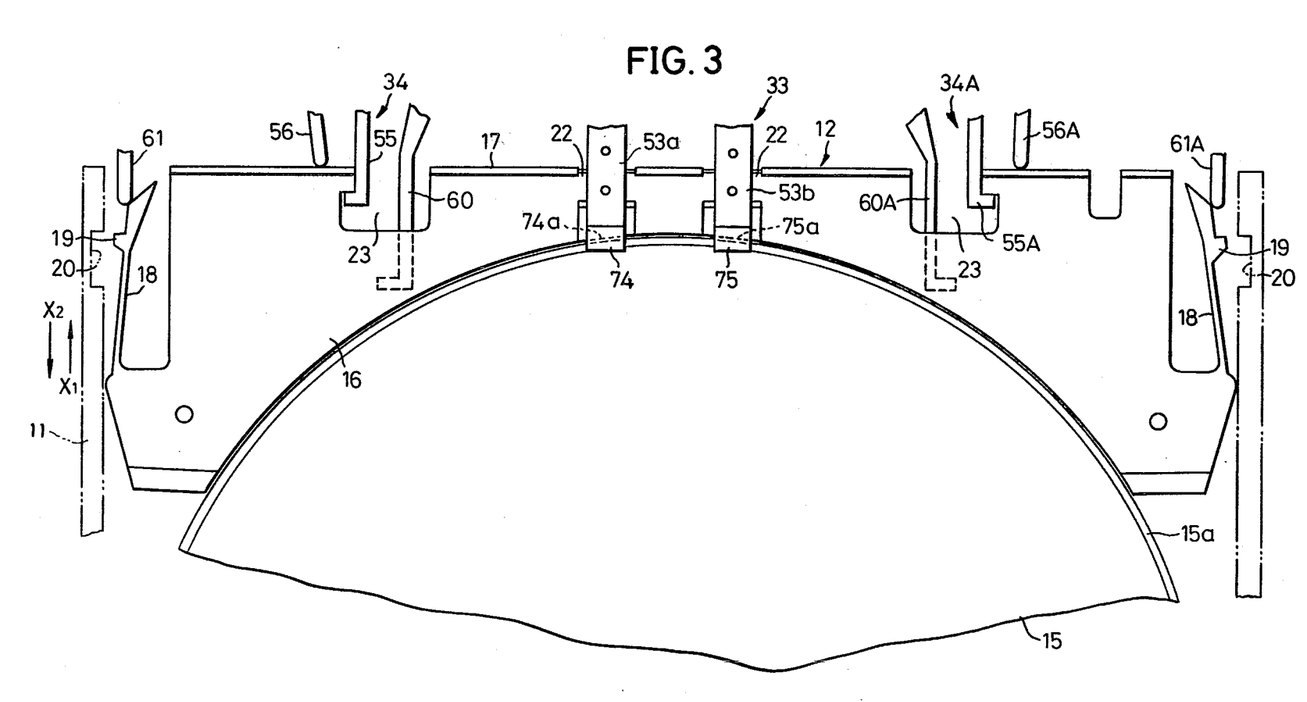
FIG. 3 is a plan view showing a state where a rotary recording medium is clamped, together with a state where a lid plate is locked.

Hence, when the disc case 10 is pushed into the final position, the connection of the lid plate 12 with respect to the jacket 11 is released, and the lid plate 12 becomes locked by the locking fingers 55 and 55A, as indicated by the two-dot chain line in FIGS. 2 and 3. Thus, the disc 15 is in a clamped state.

Next, the jacket 11 is pulled out in the direction of the arrow X2. Since the lid plate 12 and the disc 15 are respectively locked and held as described above, only the jacket 11 moves in the direction of the arrow X2, leaving behind the lid plate 12 and the disc 15. Accompanied by this operation in which the jacket 11 is pulled out from the reproducing apparatus 30, the lid plate 12 and the disc 15 are relatively pulled out from the jacket 11. In a state where the jacket 11 is separated from the enlarging mechanism 31 and is completely pulled out from the reproducing apparatus 30, the disc 15 is supported horizontally at a position directly above the turntable 32, by the clamping mechanism 33 and a support structure 69 which is in a raised position.

When a play operation is performed, the disc 15 is lowered and placed onto the turntable 32, and is clamped. In addition, the disc 15 is rotated towards a clockwise direction together with the turntable 32.

Moreover, the carriage 45 is moved by a moving mechanism 50 in the direction of the arrow Y1 from a waiting position, to reproduce the information signal by the reproducing stylus 46 which relatively scans the recording surface of the disc 15. Next, an operation in which the disc 15 is recovered from within the reproducing apparatus 30, will now be described.

Upon completion of the reproducing operation, the disc 15 is pushed upwards by the support structure 62. The disc 15 which is pushed up, is clamped by the disc clamping mechanism 33.

Upon recovering of the disc 15, an empty jacket 11 is again inserted into the reproducing apparatus 30 through the inserting opening 51, with the opening of the jacket 11 first. Thus, the enlarging mechanism 31 is pushed by the jacket 11 and moves in the direction of the arrow X1, to enlarge the opening 24 of the jacket 11. As the jacket 11 is inserted towards the direction of the arrow X1, the disc 15 is relatively inserted into the jacket 11 through the opening 24 of the jacket 11.

When the jacket 11 is inserted into the innermost position inside the reproducing apparatus 30, the disc 15 becomes completely incased within the jacket 11, and furthermore, the locked lid plate 12 is relatively inserted into the opening 24 of the jacket 11 to close the opening 24 of the jacket 11.

In addition, the latch with respect to the main levers 57 and 57A are released, and the main levers 57 and 57A rotationally return by following the movement of the jacket 11 which is pulled out in the direction of the arrow X2, and hence the locking mechanisms 34 and 34A are disconnected from the lid plate 12.

Therefoe, when the jacket 11 is pulled out in the direction of the arrow X2, the lid plate 12 then moves in the same direction together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, description will be given with respect to the construction and operation of the disc clamping mechanism 33 which form essential parts of the apparatus according to the present invention, with further reference to FIGS. 4 through 12.

The disc clamping mechanism 33 is provided at the innermost part of the reproducing apparatus, and substantially comprises the upper clamp arm member 53, the lower clamp arm member 54, a mechanism for locking the upper clamp arm member 53 for clamping the disc, and a mechanism for holding tightly the lower clamp arm member 54 at the horizontal position upon clamping the disc.

The clamp arm members 53 and 54 respectively have a pair of clamp arms 53a, 53b and 54a, 54b, and are pivoted on pins 71 and 71 in common and supported inside a support bracket 72. The support bracket 72 is fixed on an L-shaped bracket 73 disposed at the innermost part of the reproducing apparatus 30. The clamp arms 53a and 54a and the clamp arms 53b and 54b are respectively in a positional relationship opposing each other in a vertical direction. One upper clamp arm 53a has a clamp arm 74 indicated in FIGS. 8A and 8B, which is fixed at the tip end of the clamp arm 53a. The other upper clamp arm 53b is provided, at the tip end thereof, with a clamp finger 75 indicated in FIGS. 9A and 9B. Both lower clamp arms 54a and 54b are respectively provided with a clamp finger 76 indicated in FIGS. 10A and 10B. The clamp fingers 74 and 75 respectively have, at their front ends, triangular-crosssectional projections 74a and 75a, which are respectively defined by a pair of sloping surfaces 74b, 74c and 75b, 75c. The clamp finger 76 has a flat surface 76a.

Figure 5:
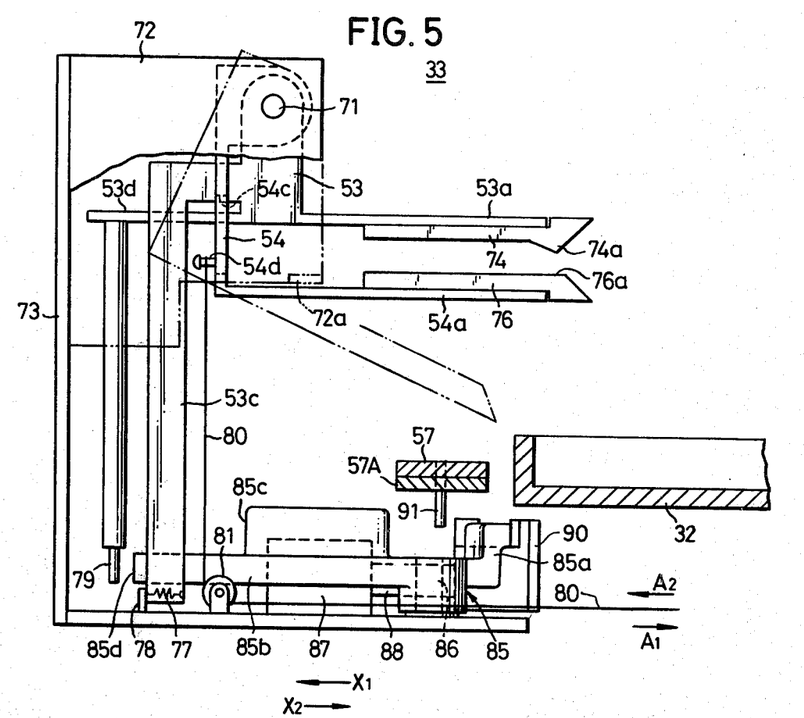

The upper clamp arm member 53 has, at rear side thereof, a leg 53c extending vertically and an extending lug 53d. The leg 53c contact a stop lug 78 by an extremely weak spring 77, and hence the clamp arm member 53 is kept at a rotational position where the clamp arm 53a extending horizontally as indicated in FIG. 5. On the lower surface of the extending lug 53d is embeddedly fixed a pin 79.

The lower clamp arm member 54 is of L-shape in side view, and has an opening 54c and a lug 54d both formed in a vertical wall of the clamp arm member 54. Between the lug 54d and a clamp control lever 92 described hereinafter, a wire 80 is stretched with guided by a pulley 81.

The above upper and lower clamp arm members 53 and 54 are assembled each other in a state where the extending lug 53d passes loosely through the wide opening 54c, thus allowing each clamp arm members 53 and 54 to rotate independently each other.

An L-shaped lock arm member 85 is pivotally supported on a pin 86 embedded in a floor of the L-shaped bracket 73. One arm 85a of the lock arm member 85 is connected to a self-lock mechanism. While, the other arm 85b has, at an intermediate part thereof, a rib 85c for engagement, and at a tip end thereof, an engagement cam 85d which is adapted to cooperate with the pin 79.

A self-lock mechanism structure 87 is fixed at a predetermined position on the floor of the L-shaped bracket 73. This self-lock mechanism structure 87 is adapted to lock a rod 88 upon being pushed in the direction of the arrow X1, and to unlock the rod 88 upon being pushed again in the same direction. A coil spring 89 for restoring is fitted around the rod 88. Further, a connecting adapter 90 for connecting with the above arm 85a is fixed at the tip end of the rod 88.

The main levers 57 and 57A are connected each other at their free ends by a connecting pin 91. This connecting pin 91 projects downwardly so as to cooperate with the rib 85c as will be described hereinafter. One main lever 57A has a bent arm 57A-1 formed to oppose the adapter 90.

Figure 11:
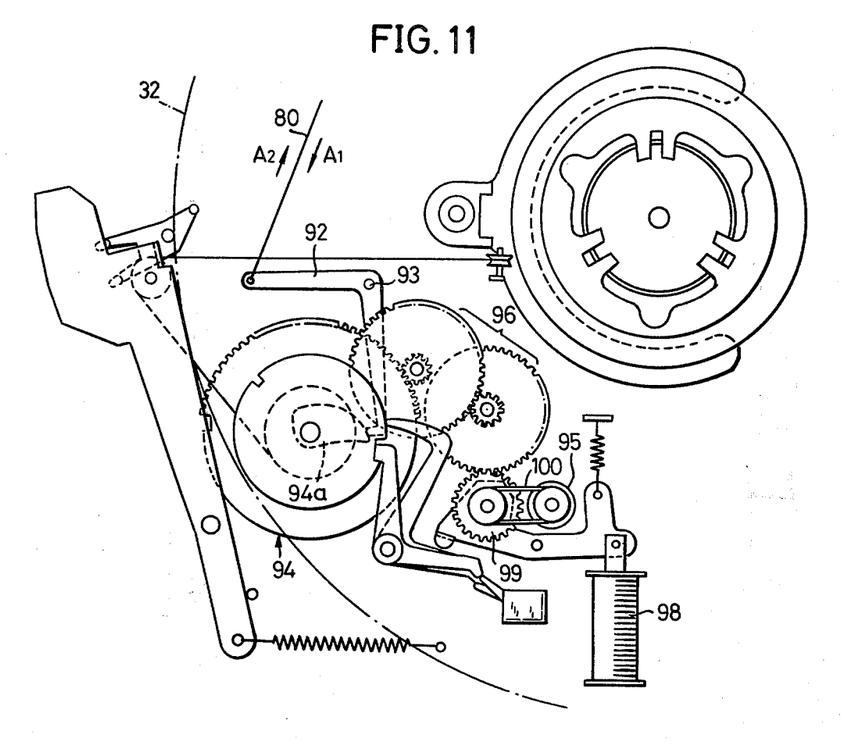
FIG. 11 is a plan view showing one embodiment of a mechanism for holding the lower clamp arm member of the clamping mechanism at a horizontal rotational position thereof.

Referring to FIGS. 2 and 11, the L-shaped clamp control Lever 92 having one arm to which the wire 80 is connected, is pivoted on a pin 93 in a chassis in a manner such that the other arm opposes a cam 94a of a cam-gear structure 94. This cam-gear structure 94 is rotated by a motor 95 by way of reduction gears 96.

Next, an operation of the mechanism of the above construction will now be described.

Figures 4, 6:
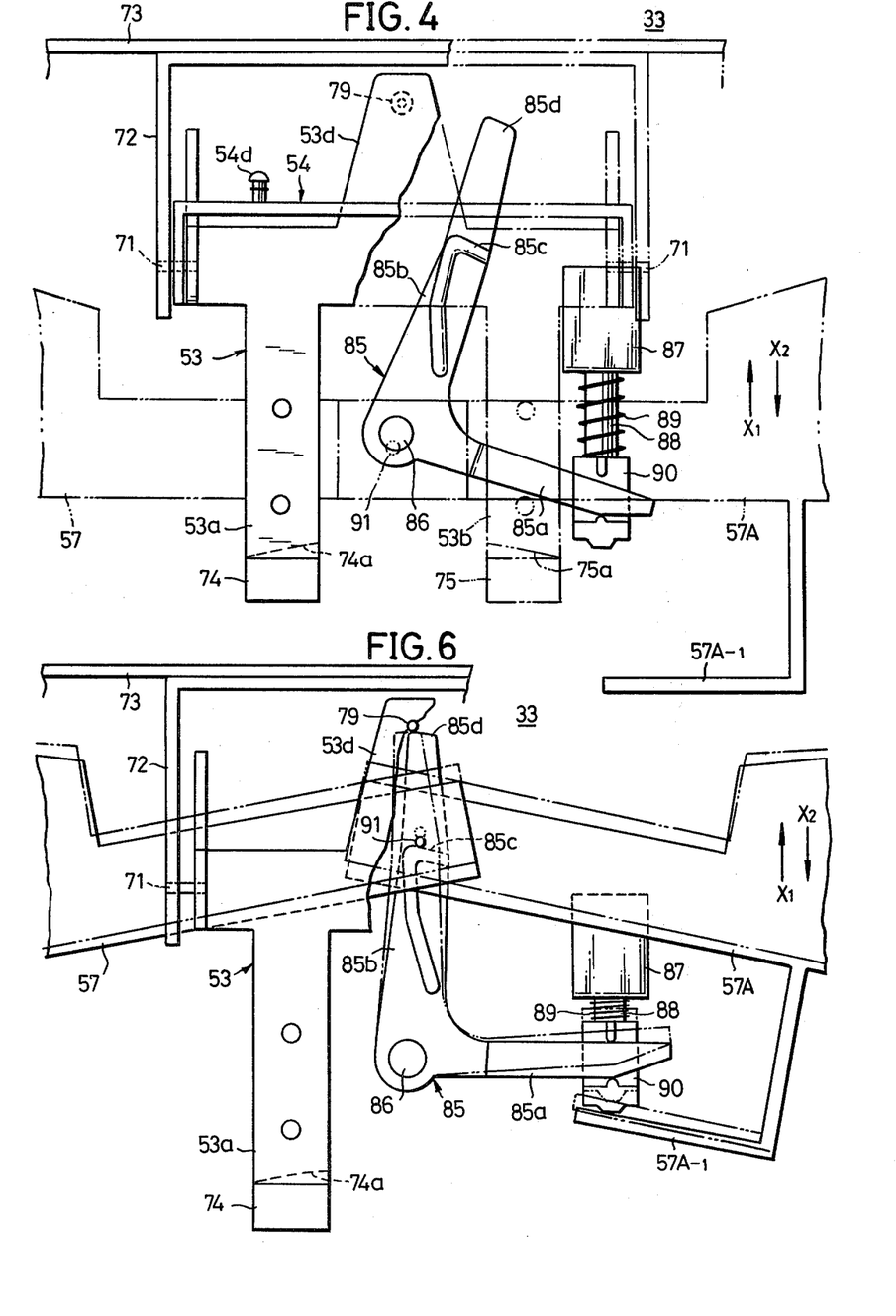
FIGS. 4 and 5 are a plan view and a side view, with part cut away and on large scale, respectively showing one embodiment of a rotary recording medium clamping mechanism constituting an essential part of the reproducing apparatus of the present invention, in a state before clamping.
FIGS. 6 and 7 are a plan view and a side view, on large scale, respectively showing the rotary recording medium clamping mechanism, in a state after clamping is effected.

Before insertion of the disc case 10, the disc clamping mechanism 33 is assuming a state indicated in FIGS. 2 and 4, and a state indicated by two-dot chain line in FIG. 5. That is, the clamp control lever 92 is rotated clockwise, and hence the lower clamp arm member 54 is rotated downwards by its own weight. The lock arm 85 is rotated clockwise, thus allowing the upper clamp arm member 53 to rotate upwards.

Upon insertion of the disc case 10, a loading-eject button 97 is pushed. Responsive to this operation, a plunger solenoid 98 is energized, and the motor 95 begins to rotate. When the plunger solenoid 98 is energized, a gear 99 is brought into mesh with the reduction gears 96, as indicated in FIG. 11. The gear 99 rotates clockwise by means of the motor 95 by way of a belt 100. The rotation of the gear 99 is transmitted by way of the reduction gears 96 to the cam-gear structure 94, which thereby rotates counterclockwise at a reduced speed up to a rotational position indicated in FIG. 11. Due to the rotation of the cam-gear structure 94, the cam 94a rotates the clamp control arm 92 counterclockwise, and hence the wire 80 is pulled in the direction of arrow A1 to cause the lower clamp arm member 54 to rotate counterclockwise. The lower clamp arm member 54 is exerted with large torque in the counterclockwise direction by the wire 80 and is brought into pressed contact against a bent portion 72a of the support bracket 72 to limit the rotation thereof in the counterclockwise direction. Accordingly, the lower clamp arm member 54 is held tightly at the rotational position, indicated by full line in FIG. 11, where the clamp arms 54a and 54b extend horizontally.

When the disc clamping mechanism 33 is assuming the above described state, the disc case 10 is inserted into the reproducing apparatus 30.

When the disc case 10 is inserted to the final position of the reproducing apparatus 30, the main levers 57 and 57A are pushed by the lid plate 12 to rotate, whereby the lid plate 12 and the outer peripheral groove guard 15a of the disc 15 enter between the upper and lower cramp arms 53a, 53b, 54a, and 54b in succession, and immediately thereafter, the upper clamp arm member 53 is locked at a position capable of clamping the groove guard 15a.

Figures 7, 10A, 10B:
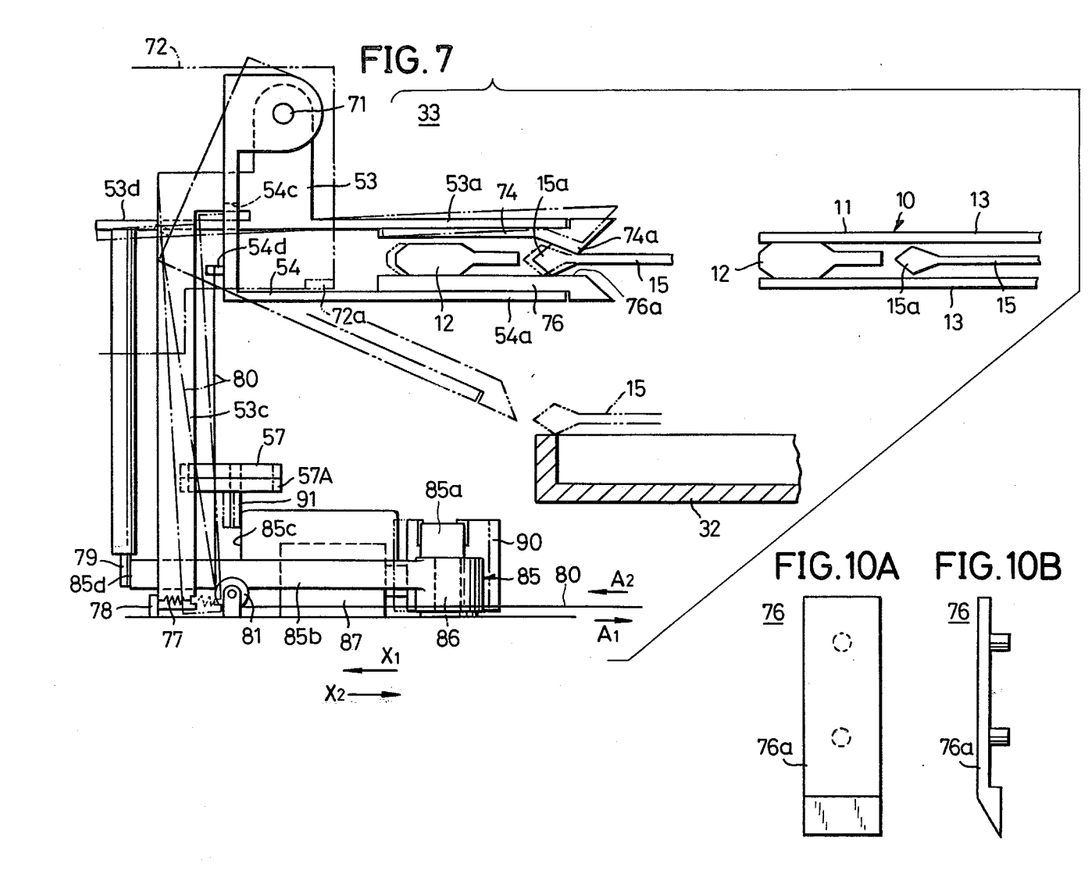
FIGS. 10A and 10B are a front view and a side view, respectively showing one embodiment of a lower clamp finger of the clamping mechanism.

That is, due to the rotation of the main lever 57A, the bent arm 57A-1 pushes the adapter 90 in the direction of the arrow X1, which moves temporarily up to a position indicated by two-dot chain line in FIGS. 6 and 7 and then slightly returns, in the direction of the arrow X2 over a distance corresponding to an overstroke, to a position indicated by the solid line in the same figures, where the adapter 90 is locked by the self-lock mechanism structure 87. As the adapter 90 moves, the lock arm 85 rotates, and the rib 85c engages the connecting pin 91 which has moved in the direction of the arrow X1, thereby to lock the main levers 57 and 57A. The main levers 57 and 57A respectively undergo maximum rotation up to the positions indicated by two-dot chain line in FIG. 6, and then slightly return, in the opposite directions, to the positions indicated by the solid line in the same figure, where they are locked. Further, the engagement cam 85d of the lock arm 85 reaches the position where it engages or catches the pin 79.

A relative positional relationship among the upper clamp arm member 53, the lock arm 85, and the like are determined so that the engagement cam 85d is assuming a position offset or separated from the pin 79 until the outer peripheral groove guard 15a of the disc 15 passes through the ridges 74a and 75a of the clamp fingers 74 and 75, and is brought to a position where engaging the pin 79 immediately after the above groove guard 15a has passed through the ridges 74a and 75a.

When ride-over parts 22 of the lid plate 12 and the outer peripheral groove guard 15a of the disc 15 enter between the upper and lower clamp arms, the upper clamp arm member 53 is in a state of being capable of rotating in the counterclockwise direction with small force. Accordingly, the ride-over parts 22 and the groove guard 15a push the upper clamp arms 53a and 53b upwards as indicated by two-dot chain line in FIG. 7 and then enter between the upper and lower clamp arms 53a and 54a smoothly.

When the engagement cam 85d of the lock arm 85 engages with the pin 79, the upper clamp arm member 53 is locked at a rotational position indicated by full line in FIG. 7, thereby to be mechanically restricted from rotation in the counterclockwise direction.

Accordingly, the upper and lower clamp arm members 53 and 54 are both held tightly in their state of approaching each other with a short distance interposed therebetween. In this locked state, the ridges 74a and 75a of the clamp fingers 74 and 75 are positioned to confront the inner side of the groove guard of the disc 15, and catch or clamp the disc 15 at the outer peripheral groove guard 15a in cooperation with the lower flat clamp fingers 76 and 76. Therefore, even though the disc 15 is urged to move in the direction of the arrow X2, the groove guard 15a is caught by the ridges 74a and 75a of the upper clamp fingers 74 and 75 and hence is restricted from moving in the same direction. As a result, the slipping of the groove guard 15a out of the space between the upper and lower clamp arms in the direction of the arrow X2 is positively prevented. Therefore, when the jacket 11 is pulled, the disc 15 is positively left inside the reproducing apparatus 30, and only the jacket 11 is extracted.

When the engagement cam 85d of the lock arm 85 engages the pin 79, no force is developed for resisting disc insertion operation. Moreover, the disc case insertion operation does not accompany any operation of causing the spring to deform forcibly as occured in the above stated previously proposed apparatus. This means that the disc case insertion operation can be effected up to the final position with a small force. Accordingly, the disc case insertion operation can be carried out with good tactile feeling of the operation, and without pushing back the reproducing apparatus itself when the disc case is inserted to the final position. Furthermore, there is no possibility which the jacket is extracted before the disc case reaches the final position, and hence the disc is not clamped.

After the jacket 11 is pulled out of the reproducing apparatus, a play button 101 is pushed. Responsive to this operation, the motor 95 begins to rotate in reverse direction, and hence the cam-gear structure 94 rotates clockwise up to the original position indicated in FIG. 2. As a result of the rotation of the cam-gear structure 94, the clamp control lever 92 rotates clockwise thereby to pay out the wire 80 in the direction of an arrow A2. Accordingly, the lower clamp arm member 54 rotates clockwise by its own weight as indicated by two-dot chain line in FIG. 7, to release the clamping with respect to the disc 15. As another result of the rotation of the cam-gear structure 94, the support structure 62 moves downwards to place the disc 15 on the turntable 32.

Upon recovering of the disc 15, the loading-eject button 97 is pushed again. Responsive to this operation, the motor 97 starts and the cam-gear structure 94 rotates counterclockwise, and hence the support structure 62 moves upwards and the lower-clamp arm member 54 rotates to the position indicated by full line in FIG. 7, similarly as in the preceding disc loading mode. Accordingly, the disc 15 is supported above the turntable 32 and clamped at the groove guard 15a thereof.

When the empty jacket 11 is inserted to the innermost position inside the reproducing apparatus 30, the adapter 90 is pushed to release the self-locked state, and hence each member returns from a state indicated in FIG. 6 to the original state indicated in FIG. 4. As for the lock arm 85 in particular, at a time instant immediately before the groove guard 15a passes through the ridges 74a and 75a of the clamp fingers 74 and 75, the engagement cam 85d is disengaged from the pin 79, and hence the clamp arm member 53 is released from the locked state. Accordingly, the groove guard 15a pushes the clamp arms 53a and 53b upwards smoothly to be slipped out between the upper and lower clamp arms, and the disc 15 separates from the reproducing apparatus 30 to be recovered within the jacket 11.

Additionally, the lower clamp fingers 76 and 76 have clamp parts which are flat surface 76a and 76a, as indicated in FIGS. 10A and 10B. Accordingly, when the lid plate 12 passes between the upper and lower clamp arms 53a, 53b, 54a, and 54b, the lid plate 12 undergoes smooth sliding on the flat surfaces 76a and 76a without generating unpleasant noise, which further improves tactile feeling of operation.

Furthermore, when the groove guard 15a passes through an entrance of a space between the upper and lower clamp arms, the upper clamp arm member 53 assumes an unlocked state. Therefore, the operation for the groove guard 15a to pass through the above entrance is performed smoothly, whereby no trouble occurs such that the groove guard 15a is scraped off with the ridges 74a and 75a.

Figure 8A:
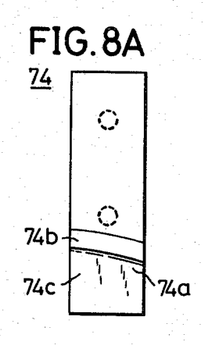
FIGS. 8A and 8B are a front view and a side view, respectively showing one embodiment of an upper clamp finger on left-handed side of the clamping mechanism.
Figure 8B:
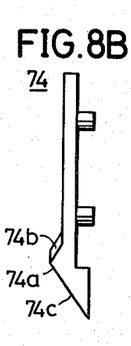
Figure 9A:
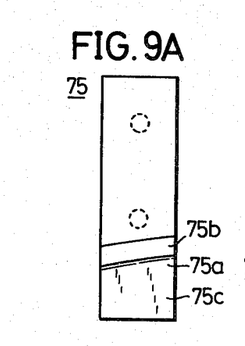
FIGS. 9A and 9B are a front view and a side view, respectively showing one embodiment of an upper clamp finger on right-hand side of the clamping mechanism.
Figure 9B:
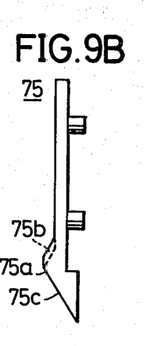

Furthermore, the ridges 74a and 75a of the upper clamp fingers 74 and 75 extend so as to along the outer peripheral groove guard 15a of the disc 15 at the position to be clamped, as indicated in FIGS. 8A and 9A. Accordingly, when the disc 15 is urged to be extracted from the clamping mechanism 33, the ridges 74a and 75a respectively receive, over the full width thereof, the groove guard 15a. Therefore, the ridges 74a and 75a prevent more positively the disc 15 from being extracted, without damaging the groove guard 15a of the disc 15.

Figure 12:
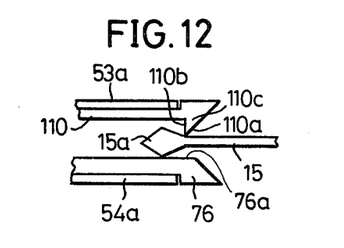
FIG. 12 is a side view showing a clamping part of another embodiment of the rotary recording medium clamping mechanism constituting an essential part of the apparatus of the present invention.

FIG. 12 shows a disc clamp part of another embodiment of a disc clamping mechanism which constitutes an essential part of the apparatus of the present invention. In FIG. 8, parts which correspond to those in FIGS. 5 and 7 are designated by like reference numerals. Detailed description of such parts will not be repeated.

An upper clamp finger 110 has a latch part 110c defined by a external sloping surface 110a and an internal vertical surface 110b. The disc clamping mechanism using this clamp finger 110 operates to prevent more positively the groove guard 15a of the disc 15 from slipping out between the upper and the lower clamp arms.

Further, a modification is made so that a plunger solenoid for locking the upper clamp arm member 53 is provided, which plunger solenoid is energized whereupon the case is inserted into a predetermined position inside the reproducing apparatus, to operate a lock mechanism to lock the upper clamp arm member 53 at a position in a vicinity of the lower clamp arm member 54.

Further, this invention is not limited to the above described embodiments, but various variations and modifications may be made without departing from the scope of the present invention.

What is claimed is:

1. A rotary recording medium reproducing apparatus for reproducing a rotary recording medium accommodated within a case, said case comprising a jacket having a space for accommodating said rotary recording medium and an opening for enabling said rotary recording medium to go into and out of said jacket, and a lid member inserted through said opening of said jacket for closing said opening of said jacket, said lid member having ride-over parts, said rotary recording medium reproducing apparatus comprising:

an inserting opening in said apparatus through which said case is inserted;

a rotary recording medium having an outer peripheral guard groove;

a rotary recording medium clamping mechanism in an innermost part of said reproducing apparatus, for clamping said outer peripheral groove guard of said rotary recording medium when said case is inserted into said reproducing apparatus and then said jacket is pulled from said reproducing apparatus;

a lid member locking mechanism for locking said lid member, the ride-over parts being ridden over by said rotary recording medium clamping mechanism, upon insertion of said lid member into said reproducing apparatus together with said jacket; and turntable means for rotating said rotary recording medium clamped and left inside said reproducing apparatus, said rotary recording medium clamping mechanism comprising a rotatable lower clamp member, a mechanism for holding said lower clamp member in a substantially horizontal position upon clamping, an upper clamp member rotatable to oppose said lower clamp member and having projection means which project downwardly at a tip end thereof, and a mechanism for locking said upper clamp member, after said ride-over parts of said lid member and said outer peripheral groove guard of said rotary recording medium enter between said upper and lower clamp members, when said projection faces the inner side of said outer peripheral groove guard, said rotary recording medium clamping mechanism being constructed so that said lid member is accommodated between said upper and lower clamp members when said rotary recording medium is clamped by said rotary recording medium clamping mechanism.

2. A reproducing apparatus as claimed in claim 1 in which said lower clamp member has a flat surface at a tip end side thereof.

3. A reproducing apparatus as claimed in claim 1 in which said holding mechanism comprises a wire connected at one terminal thereof to said lower clamp member to rotate the same toward horizontal direction when pulled, a rotatable lever to which the other terminal of said wire is linked, and a cam mechanism for rotating said rotatable lever in a direction of pulling said wire.

4. A reproducing apparatus as claimed in claim 1 in which said projection of said upper clamp member is a ridge defined by a pair of sloping surfaces each of which respectively confronting a center of said rotary recording medium and said groove guard in a state of clamping said rotary recording medium.

5. A reproducing apparatus as claimed in claim 4 in which said ridge extends in the direction along said groove guard when clamping said rotary recording medium.

6. A reproducing apparatus as claimed in claim 1 in which said projection of said upper clamp member is a latch part defined by a sloping surface and a vertical surface respectively confronting a center of said rotary recording medium and said groove guard in a state of clamping said disc.

7. A rotary recording medium reproducng apparatus for reproducing a rotary recording medium accommodated within a case, said case comprising a jacket provided with a space for accommodating said rotary recording medium and an opening for enabling said rotary recording medium to go in and out of said jacket, and a lid member inserted through said opening of said jacket for closing said opening of said jacket, said rotary recording medium reproducing apparatus comprising:

an inserting opening in said apparatus through which said case is inserted;

a rotary recording medium clamping mechanism in an innermost part of said reproducing apparatus, for clamping an outer peripheral groove guard of said rotary recording medium when said case is inserted into said reproducing apparatus and then said jacket is pulled from said reproducing apparatus; and turntable means for rotating said rotary recording medium clamped and left inside said reproducing apparatus.

said rotary recording medium clamping mechanism comprising a rotatable lower clamp member, a mechanism for holding said lower clamp member in a substantially horizontal position upon clamping, an upper clamp member rotatable to oppose said lower clamp member and having projection means projecting downwardly at a tip end thereof, and a mechanism for locking said upper clamp member, after said outer peripheral groove guard of said rotary recording medium enters between said upper and lower clamp members, when said projection faces the inner side of said outer peripheral groove guard, said locking mechanism comprising a lock lever undergoing a rotation interrelatedly with a case insertion into said reproducing apparatus, and a mechanism for holding said lock lever, when said case is inserted to the innermost position, at a position where said lock lever has rotated at this time instant, said lock lever, at a rotational position held by said holding mechanism, engaging a part of said upper clamp member to lock the same so that said projection does not move upwards.

* * * * *